United States Patent
Cowan et al.

(10) Patent No.: US 6,698,466 B1
(45) Date of Patent: Mar. 2, 2004

(54) PRESSURIZED CONTAINER ADAPTER FOR CHARGING AUTOMOTIVE SYSTEMS

(75) Inventors: David M. Cowan, Brooklyn, NY (US); Jochen Schapers, New York, NY (US); Saul Trachtenberg, New York, NY (US); Nikolay V. Nikolayev, Flushing, NY (US)

(73) Assignee: Interdynamics, Inc., Brooklyn, NY (US)

( * ) Notice: Subject to any disclaimer, the term of this patent is extended or adjusted under 35 U.S.C. 154(b) by 0 days.

(21) Appl. No.: 10/156,219

(22) Filed: May 28, 2002

Related U.S. Application Data

(63) Continuation-in-part of application No. 10/032,980, filed on Dec. 28, 2001, now Pat. No. 6,539,988.

(51) Int. Cl.[7] ............................................. B65B 1/04
(52) U.S. Cl. ................. 141/67; 141/351; 141/330; 222/5; 222/81; 137/614.04; 251/149.1
(58) Field of Search ............................... 141/2, 18, 67, 141/349–354, 383, 384, 382, 386, 329, 330, 19; 137/614.03, 614.04; 251/149, 149.1, 149.2; 222/5, 81, 82

(56) References Cited

U.S. PATENT DOCUMENTS

| | | | |
|---|---|---|---|
| 3,131,733 A | 5/1964 | Monahon | |
| 3,448,779 A | 6/1969 | Horwitt | |
| 3,907,012 A | 9/1975 | Burke | |
| 3,976,110 A | 8/1976 | White | |
| 4,644,982 A | 2/1987 | Hatch | |
| 4,903,741 A | 2/1990 | Ibanez | |
| 4,995,417 A | 2/1991 | Naku | |
| 5,248,125 A | 9/1993 | Fritch et al. | |
| 5,329,975 A | * 7/1994 | Heitel | 141/19 |
| 5,609,195 A | 3/1997 | Stricklin et al. | |
| 5,626,173 A | 5/1997 | Groult | |
| 6,079,444 A | 6/2000 | Harris et al. | |
| 6,296,228 B1 | * 10/2001 | Knowles et al. | 251/149.1 |
| 6,360,795 B1 | 3/2002 | Bothe et al. | |

* cited by examiner

Primary Examiner—Steven O. Douglas
(74) Attorney, Agent, or Firm—Levisohn, Berger & Langsam, LLP

(57) ABSTRACT

A dispensing adapter for connecting pressurized containers to other valved systems such as automobile air conditioners is provided. The housing has a dispensing end, a receiving end, and fluid flow channel communicating between the dispensing end and the receiving end. The receiving end sealingly engages a first valve of a pressurized container, and the dispensing end sealingly engages a second valve such as a service port of an automobile air conditioner. When the dispensing end is attached to the service port, the core depressor opens the service port. A button, when depressed, pushes down and thus opens the valve on the pressurized container. The housing may be angled or straight.

13 Claims, 10 Drawing Sheets

PRESSURIZED CONTAINER ADAPTER FOR CHARGING AUTOMOTIVE SYSTEMS

RELATED APPLICATIONS

This application is a Continuation-in-part of U.S. patent application Ser. No. 10/032,980 filed Dec. 28, 2001 now U.S. Pat. No. 6,539,988 and incorporates by reference all of the teachings therein.

BACKGROUND OF THE INVENTION

1. Field of the Invention

The invention relates to fluid flow devices for dispensing fluids (i.e., suspended solids, liquids, and gases) from pressurized containers. More specifically, the invention relates to attachments for easily connecting pressurized containers containing fluids to automobile air conditioner systems.

2. Description of the Related Art

Automotive systems frequently require maintenance such as the addition of various chemicals which may degrade or escape slowly with time and use. A need to dispense chemicals to automotive systems such as air conditioning units, motors, and the like is well known. Conventionally, a consumer may purchase these chemicals in a sealed pressurized container that is provided with a valve. The container valve may have a spring-biased stem which, when depressed, opens and allows the chemicals to egress from the container via the stem. Alternatively, the container valve may be of the type that needs to be punctured to release the chemicals inside (after which it is typically not re-sealable). The chemicals are introduced into the automotive system via a hose having a standard SAE fitting at one end which connects to a service port on the automobile and a cap at the other which is adapted to fit on top of the valve of the dispensing container. The valve at the container end of the hose normally includes a piercing pin which pierces the container valve or causes the stem of the container valve to be opened. The conventional hose allows the service port fitting end to be moved about and easily placed on the automotive service port.

The conventional connector hose suffers from several drawbacks. First, the hose is flexible; as a result, it can be difficult to handle and is generally unwieldy. Moreover, the connector hose has three main sections (two brass fittings and the hose) and has a not insignificant manufacturing cost associated therewith. Further, if a consumer wishes to or needs to use the connector hose on more than one container during a single use, it is difficult to interchange between various containers, typically because some of the chemicals from an emptied container linger inside the hose. As a result, the chemicals tend to drip out of the hose when the hose is disconnected from an empty container.

SUMMARY OF THE INVENTION

Accordingly, it is an object of the invention to provide a universal device for conveying chemicals from a plurality of valved systems that is easy to use and inexpensive to manufacture.

It is another object of the invention to provide a device for conveying chemicals into automobile systems in a non-messy manner.

It is another object of the invention to provide a device which insures the complete emptying of a can of chemicals into another system.

It is another object of the invention to provide a device which can be easily attached to service ports in a variety of orientations.

The above and other objects are fulfilled by the invention, which is a dispensing adapter for pressurized containers. The housing is provided with a dispensing end, a receiving end, and an interior volume communicating between the dispensing end and the receiving end. The receiving end is adapted to sealingly engage a first valve of an aerosol can, and the dispensing end is adapted to sealingly engage a second valve, preferably a valve of an automotive system, more preferably a valve in a service port for an automobile air conditioning system. In one embodiment, a reciprocatable core depressor is movably disposed in the interior volume and has a proximal end disposed closer to the receiving end and a distal end disposed closer to the dispensing end. When the core depressor is moved toward the receiving end of the housing, the proximal end of the core depressor engages a stem of the first valve and opens the first valve. When the dispensing end of the housing is attached to the second valve, the second valve engages the distal end of the core depressor, and the core depressor is moved toward the receiving end of the housing. As mentioned above, the second valve is preferably an automobile air conditioner service port and has a port valve stem. When the housing is attached to both the first and second valves, the core depressor engages the port valve stem at the distal end, and the core depressor engages the pressurized valve stem at the proximal end.

Alternatively, the core depressor may be fixed with respect to the housing and only opens the service port valve when attached thereto. In this embodiment, a push button assembly is provided to open the container. As above, the housing has a dispensing end and a receiving end, the dispensing end being in communication with the receiving end, the receiving end being adapted to sealingly engage a first valve of a pressurized container, and the dispensing end being adapted to sealingly engage a second valve. A movable button is provided in the housing between the receiving end and the dispensing end. The button has a proximal cavity, disposed closer to the receiving end adapted to receive a stem of the first valve, and a distal end disposed closer to the dispensing end. When the button is moved toward the receiving end of the housing (i.e., by a person pushing downward on it), at least one inner wall of the proximal cavity engages the stem of the first valve and opens the first valve. The button preferably further includes a fluid flow channel in communication with the proximal cavity and the dispensing end. When the first valve is opened, at least part of the fluid in the pressurized container exits the container, travels along the fluid flow channel, and exits the housing via the dispensing end. The button is preferably attached to the housing in a cantilever manner so that a top surface of the button being accessible outside the housing. When force is applied to the exposed top surface of the button, the button flexes towards the receiving end, and at least one inner wall of the proximal cavity engages the stem of the first valve to open the valve.

The receiving end preferably includes a positive lock grasping the pressurized can, which can take the form of a lip which frictionally engages a shoulder of the pressurized can.

The core dispenser preferably includes longitudinal fluid flow grooves. When the first valve is opened, at least part of the fluid in the pressurized can exits the can, travels at least partially along the longitudinal fluid flow grooves, and exits the housing via the dispensing end.

In the preferred embodiment, the receiving end is substantially flat and the housing is angled with respect to the receiving end, preferably at approximately 45° with respect to the receiving end. Alternatively, the housing may be substantially straight or at any angle from 0–90°. As another alternative, the dispensing adapter may include a piercing pin so that the invention is usable on containers having that form of valve (i.e., the type that needs to be pierced). The receiving end may be suitably threaded, as needed.

The invention relates to a plastic direct dispensing device adapted to be used in the automotive after market environment in which a chemical is carried in a container, preferably under pressure, which is released when a valve on top of the container is opened and the contents of the container are propelled into an automotive system through a port having a valve. The invention opens both valves in the container and in the port when the invention is fully engaged.

The present invention provides a very easy to use snap on dispenser which is adapted to open valves at both the dispensing and receiving end through a simple manual positive force. A lip is provided at the receiving end to grasp onto a conventional container and a mating tapered surface provided at the dispensing end to easily grab onto the general port construction found in most automobile engines or receptacle locations. The container can easily be cleaned, washed, used for different cans and otherwise makes the ability to dispense fluids so much easier, quicker, neater and less expensive than anything previously employed.

Additionally, the device is preferably angled so that a can will be attachable to a service port even if the port is not otherwise easily accessible. By angling the device, the can may be positioned at an angle between vertical and 45° regardless of the orientation of the service port.

The invention is preferably made of a few plastic parts snapped together in a simple construction. Its cost is much lower than that of the conventional hose. The invention has widespread utility and universality, and it represents a significant benefit over prior dispensing systems commonly employed in the automotive and aftermarket industry.

In the case of the preferred embodiment, the device is adapted to be attached to an automobile air conditioner low pressure service port. The chemicals in question to be added to the air conditioner include refrigerant, lubricant, performance booster, leak detector, and any other chemicals known to be addable to an air conditioning system.

DETAILED DESCRIPTION OF THE PREFERRED EMBODIMENTS

Description of the invention will now be given with reference to FIGS. 1–11. It should be noted that these figures are merely exemplary and are not meant, in any way, to limit the scope of the invention, which is defined by the claims appearing below.

Figure 1:
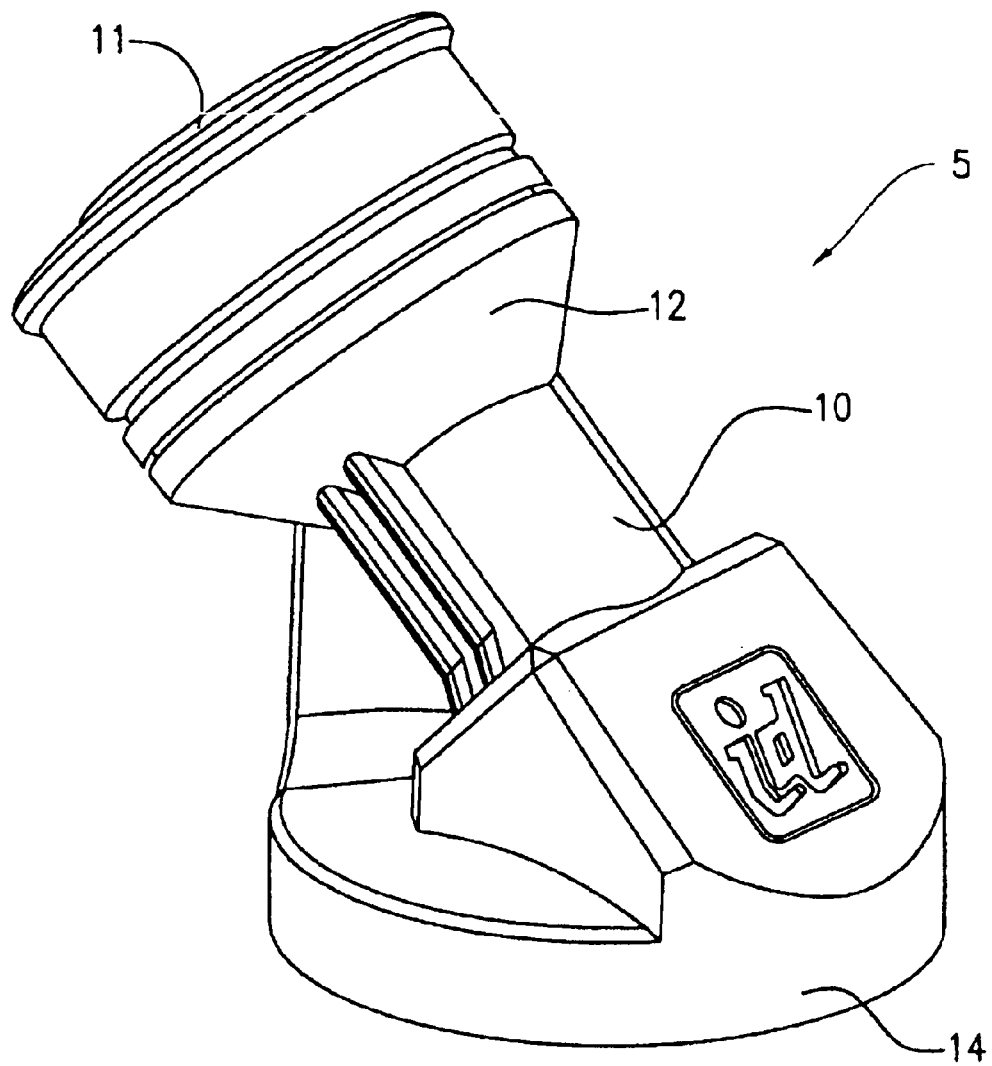
FIG. 1 is a side perspective view of a container adapter in accordance with the invention.
Figure 2:
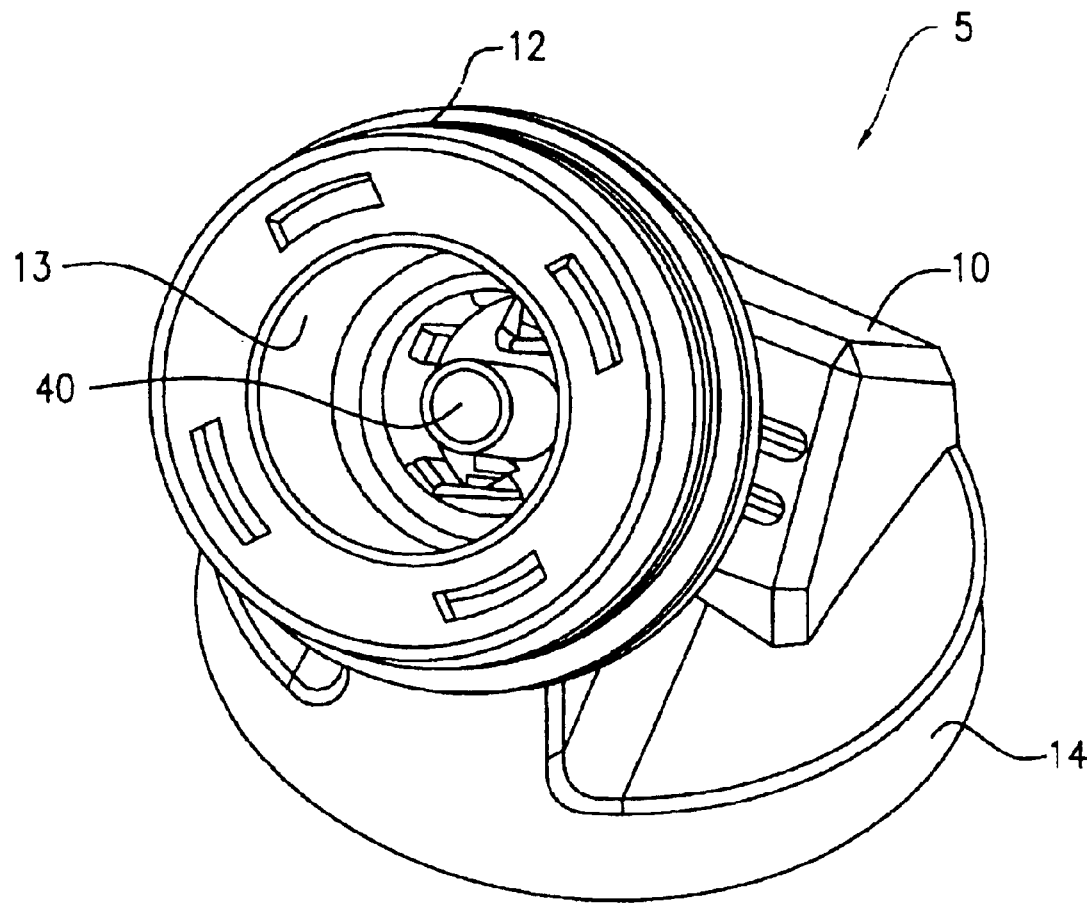
FIG. 2 is a front perspective view of the device of FIG. 1.

The specific container adapter 5 shown in FIGS. 1 and 2 is meant to be attached to a pressurized can of chemicals and an automotive service port so that the chemicals may be conveyed into the automotive system. Housing 10 is provided with a dispensing end 12 and a receiving end 14. Dispensing end 12 is attachable to an automotive service port, while receiving end 14 is attachable to the top of a can of chemicals. In the specific example shown in FIGS. 1 and 2, the service port in question is an automobile air conditioner low pressure service port, which fits into well 13 of dispensing end 12. Cap 11 may be provided to cover the dispensing end to prevent dust and debris from entering housing 10 when dispensing end 12 is not connected to a service port.

Figure 3:
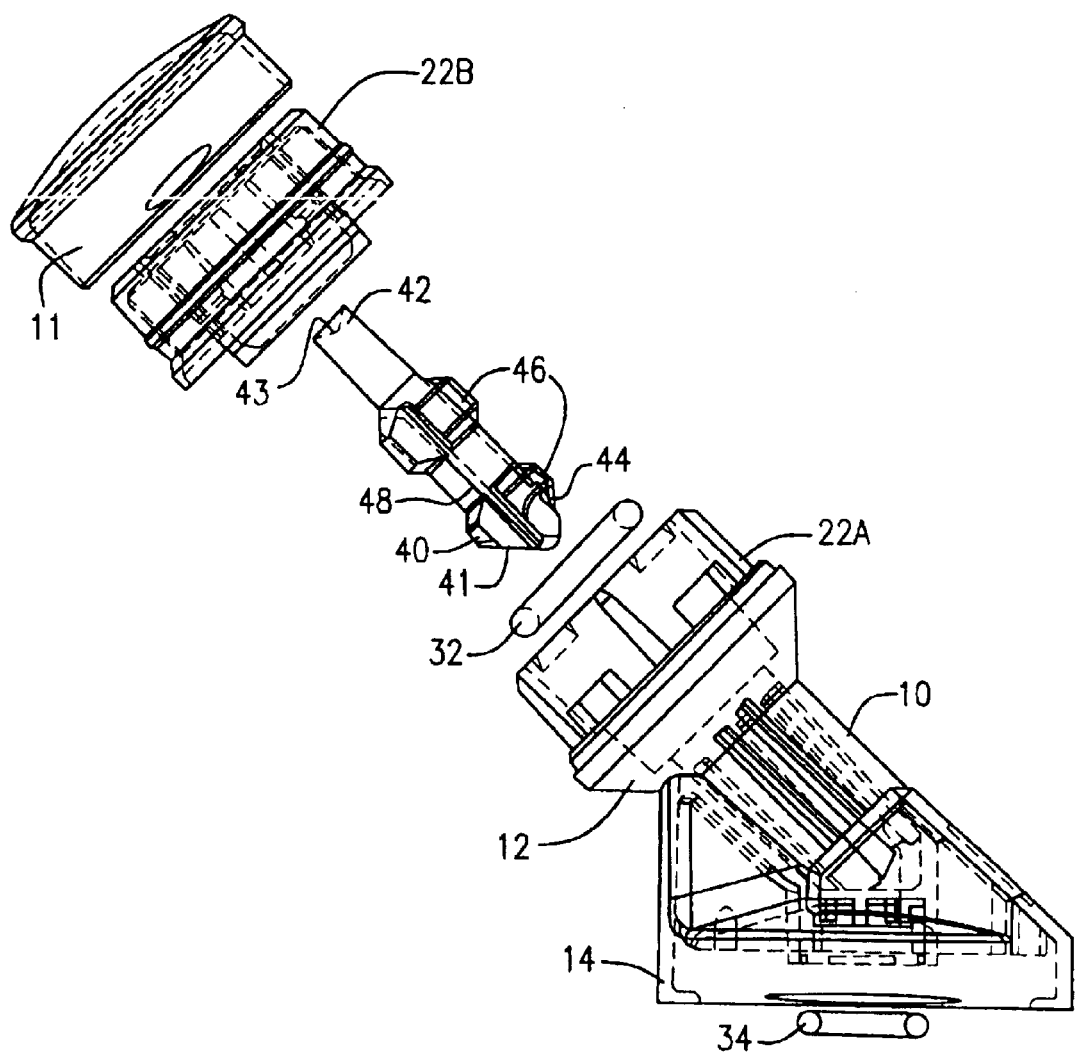
FIG. 3 is an exploded perspective view of a container adapter in accordance with the invention.

As shown in FIG. 3, dispensing end 12 includes hub 22A, which is preferably integrally formed with housing 10, and socket 22B, which fits around hub 22A. Sandwiched between hub 22A and socket 22B is O-ring seal 32. Seal 32 provides a fluid-tight seal against a service port that is inserted within well 13 so that the chemicals exiting from the housing pass into the service port and do not leak out. That O-ring seal 32 is captured between socket 22B and hub 22A enables the invention to be manufactured much more easily and cheaply than the conventional hose with brass fittings. Working with brass, it is much more difficult to insert an O-ring into a rigid single piece of brass.

A similar O-ring seal 34 is provided at receiving end 14 so as to insure that chemicals exiting from the container all pass into housing 10 instead of leaking out.

Figure 4:
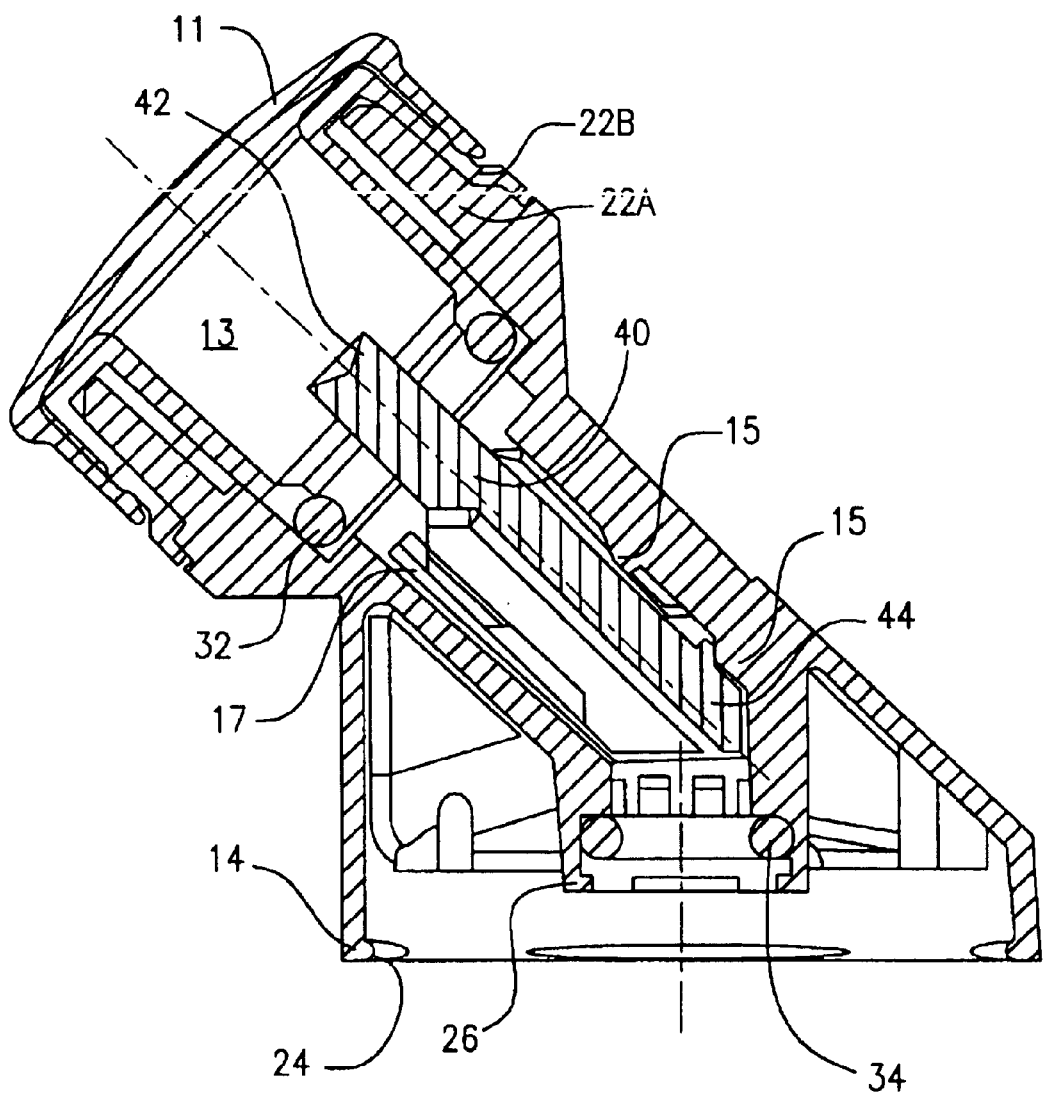
FIG. 4 is a sectional view of a container adapter in accordance with the invention.
Figure 5:
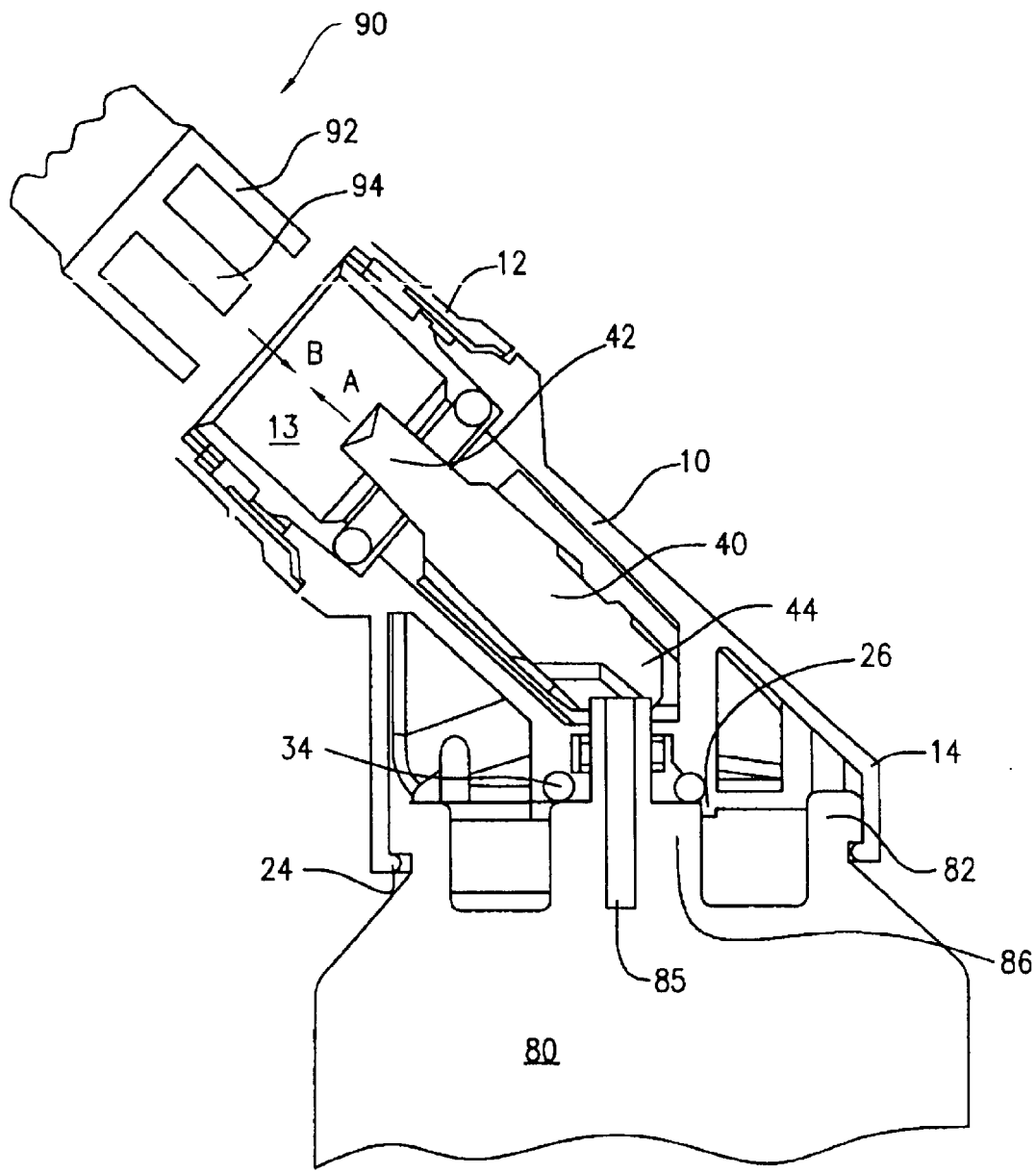
FIG. 5 is a schematic sectional view of a container adapter in accordance with the invention in place on a container.

Housing 10 is provided with an interior space (i.e., it is at least partially hollow) in which core depressor 40 is disposed (see FIGS. 3–5). Distal end 42 of core depressor 40 extends into well 13 of dispensing end 12, while proximal end 44 is closer to receiving end 14. The extreme tip of distal end 42 may be provided with a divot 43, and receiving end 44 may be provided with a flat surface 41, for reasons which will be explained below. Core depressor 40 includes projections 46 which serve to limit the movement of the core depressor. That is, when projections 46 abut internal projections 15 of housing 10, core depressor 40 is prevented from moving further in a given direction. This structure helps to retain core depressor 40 within housing 10. Projections 46 also may ride along one or more internal grooves 17 formed in the interior of housing 10; in this way, the orientation of the core depressor is always maintained and the reciprocal motion of the core depressor is made smooth.

It is preferred that receiving end 14 be made to simply snap onto a pressurized container in a manner that is secure and reassures the user that the attachment is secure. As shown in FIGS. 4 and 5, an outer lip 24 is provided to snap onto and under shoulder 82 of container 80. Inner lip 26 snap onto and under a flange (not shown) of valve housing 86 or may simply extend concentrically around valve housing 86 as shown in FIG. 4. The positive lock of lip 24 insures that the adapter will not accidentally slip off of a container during use.

FIG. 5 demonstrates the preferred embodiment in use. An automobile air conditioner service port 90 is shown in schematic view to have an outer housing 92 and a centrally disposed valve pin 94. The adapter is first placed on container 80, and valve stem 85 pushes upwards on surface 41 of core depressor 40. Stem 85 pushes upwards for at least one of two reasons: a) the contents of container 80 are pressurized, and b) valve stem 85 is typically spring-biased closed, i.e., upwards in FIG. 5. Core depressor 40 is thus pushed upwards in the direction of arrow A so that distal end 42 extends further into well 13.

When the consumer is ready to introduce fluid into the automotive system in question (in this example, the automobile air conditioner), the user places dispensing end 12 around service port 90 so that housing 92 enters well 13 in the direction of arrow B. Valve pin 94 abuts distal end 42; divot 43 may be provided to help capture and/or retain valve pin 94 to prevent the valve pin from slipping out of engagement with core depressor 40. By sliding the adapter fully onto the service port, the user causes valve pin 94 to be pushed back into service port 90 and also causes core depressor 40 to be pushed downward towards receiving end 14. This motion causes surface 41 to bear against container valve stem 85 and push it downward into can 80, thereby opening the valve on the container. Thus, the adapter opens both the service port valve and the container valve at substantially the same time, simply by placing adapter dispensing end 14 around service port 90. With both valves open, the chemicals inside the container leave the container and enter the automotive system via the adapter and the service port. Longitudinal grooves 48 (see FIG. 3) may be provided in core depressor 40 to allow the chemicals to flow more easily through the interior volume of housing 10.

Typically, the service port is either sticking upwards from the automotive system or is substantially horizontal (i.e., sticking out roughly parallel to the ground). As such, the angle of the housing with respect to receiving end 14 causes container 80 to be upended at an angle, preferably approximately 45°, so that the chemicals can exit the container not only because they are under pressure but because of gravity as well. The result is that the container will be able to be easily attached to any service port to a much greater degree than with the use of the conventional hose.

Figure 6:
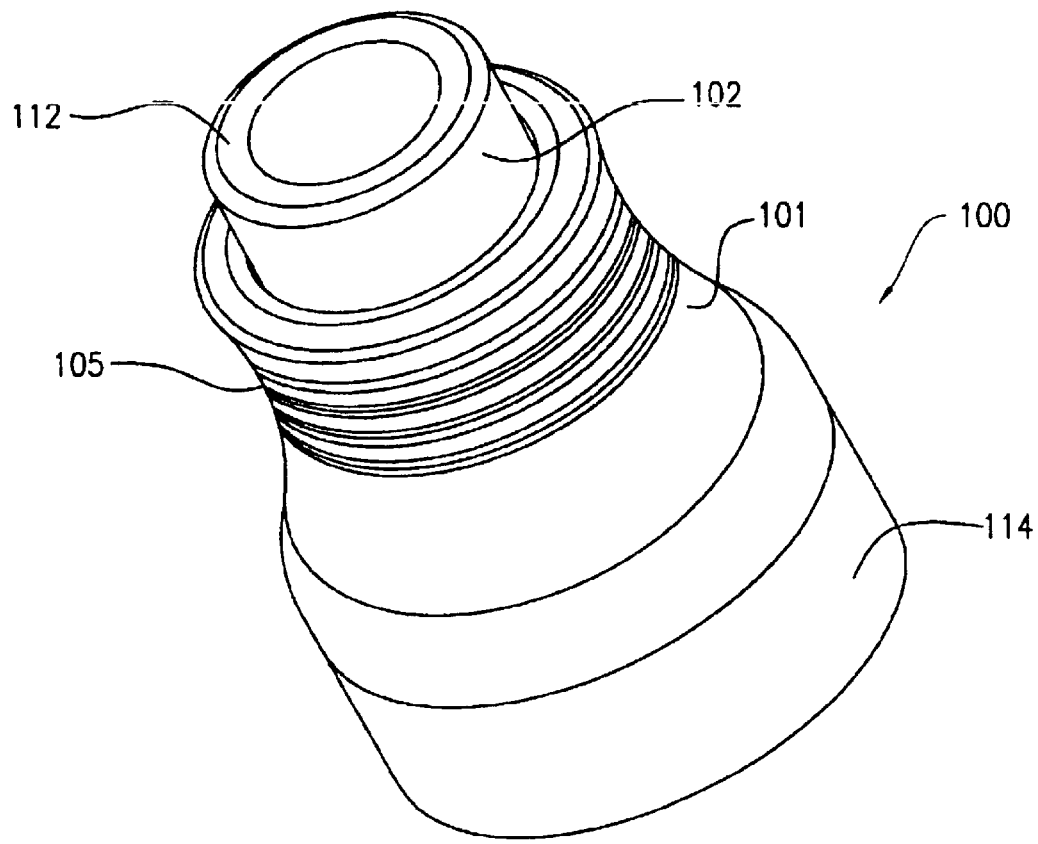
FIG. 6 is a perspective view of an alternative embodiment of the invention.
Figure 7:
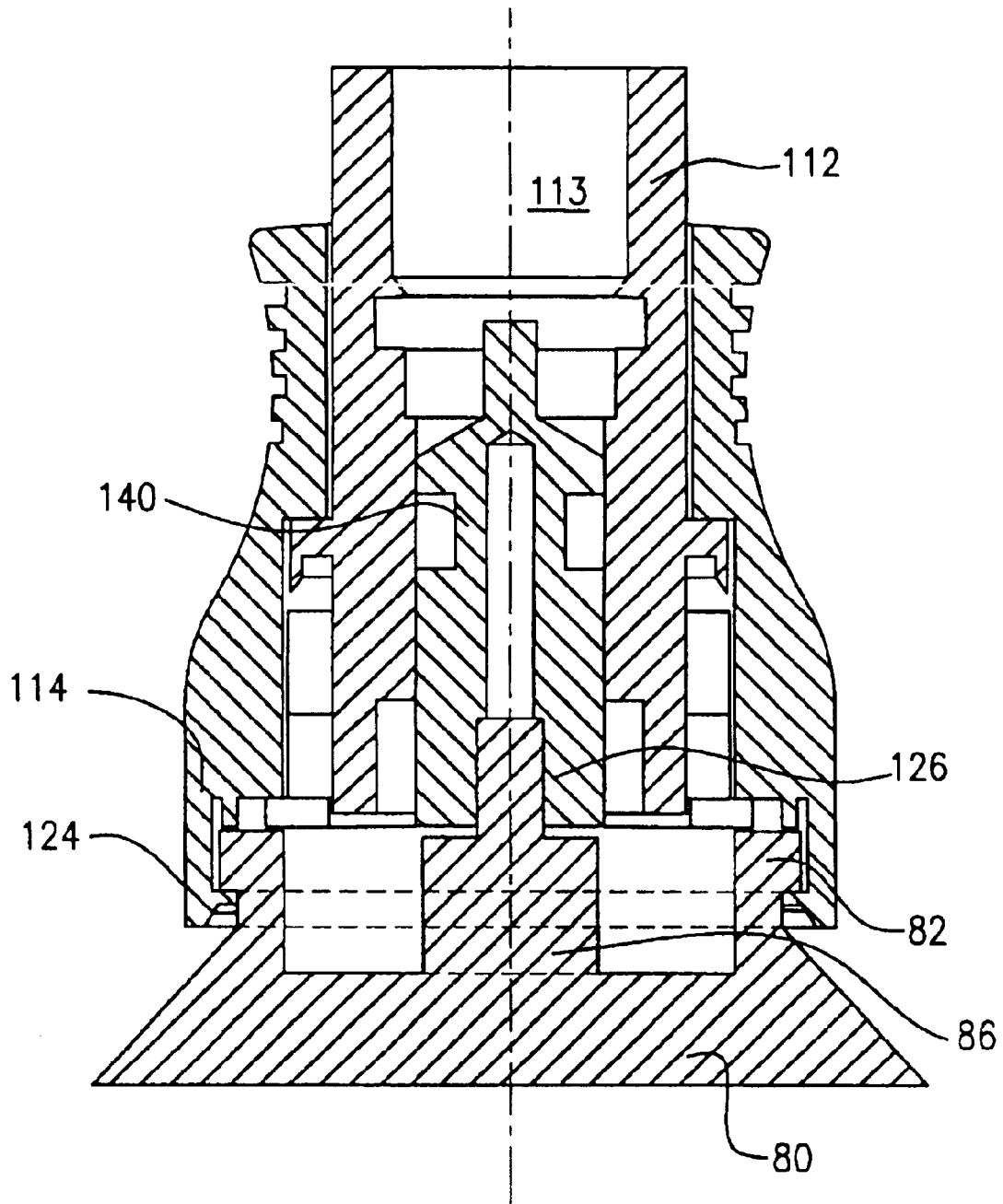
FIG. 7 is a sectional view of the embodiment of FIG. 6.

One embodiment described above and shown in FIGS. 1–5 has an angled housing 10. An alternative embodiment is shown in FIGS. 6 and 7. Adapter 100 provides a substantially straight flow path for the chemicals from the container through its housing to the service port. In the embodiment shown in FIGS. 6 and 7, the body of adapter 100 is made up of two concentric housings, outer housing 101 and inner housing 102. Outer housing 101 may be provided with ribs 105 to assist in the grip of adapter 100 during use. Overall, the housings include a dispensing end 112, substantially similar to dispensing end 12 of the angled embodiment, and a receiving end 114 substantially similar to receiving end 14 of the angled embodiment. Dispensing end 112 includes a well 113 for receiving a service port. Receiving end 114 includes outer lip 124 which snaps onto and under shoulder 82 of container 80. Inner lip 126 may snap onto and under a flange (not shown) of valve housing 86, or it may simply concentrically surround valve housing 86 in the same fashion as inner lip 26 and as shown in FIG. 7. Core depressor 140 is provided in the interior volume of inner housing 102 in a similar manner to that of core depressor 40.

The embodiment of FIGS. 6–7 is shown with inner housing 102 being movable with respect to outer housing 101. A spring (not shown) may be provided to bias inner housing 102 upwards away from receiving end 114. However, the two housings may be fixed with respect to each other and still fulfill the objects of the invention.

Figure 8:
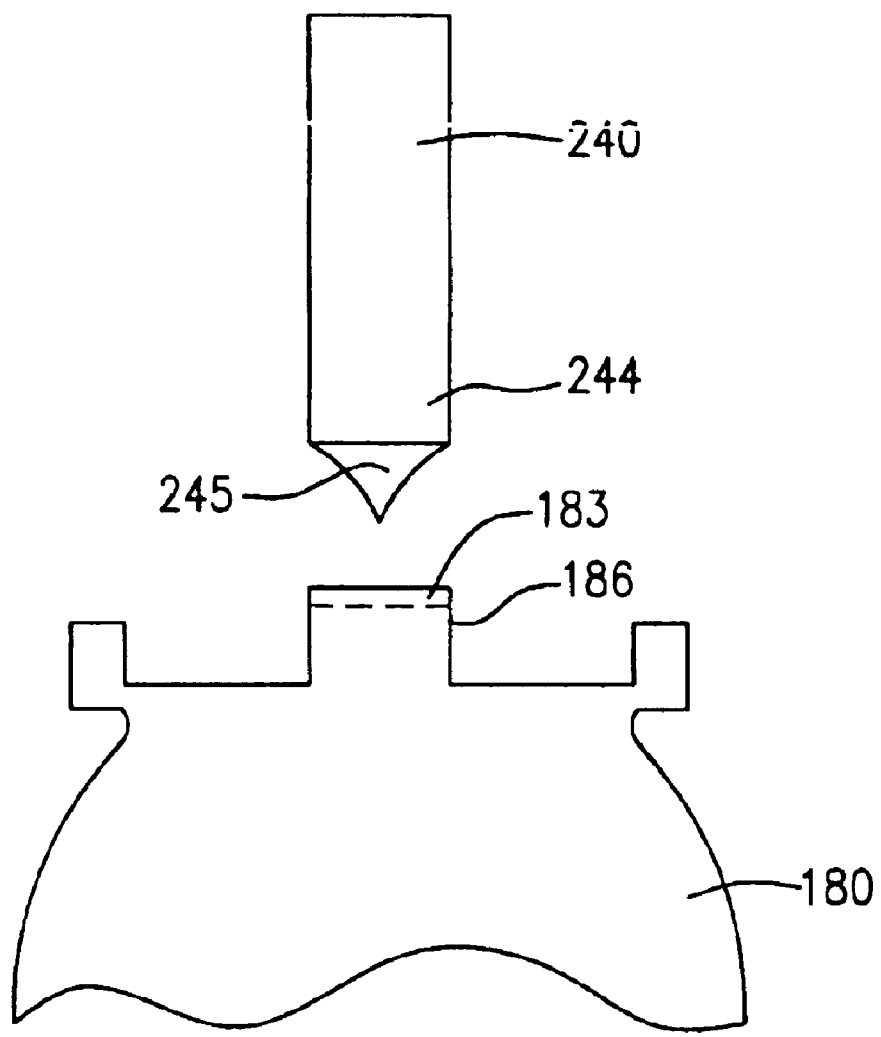
FIG. 8 is a side sectional view of an alternative embodiment in accordance with the invention.

In both of the above embodiments, a lower surface of the core depressor (40 or 140) pushes down on stem 85 of a valve in container 80. However, some containers do not have a valve with a stem. Instead, as noted above, some containers have a puncture valve. So that the invention may accommodate such containers as well as those having stem valves, an alternative version of the dispenser 310 is shown in FIG. 8. Dispenser 310 has, like the prior embodiments, a dispensing end 312 and a receiving end 314. Threads 325 are preferably provided to engage threads on the container and to allow for easy longitudinal movement of the piercing valve 350 with respect to the housing of dispenser 310 and container 180. It should be noted that other means of moving the piercing valve that are known in the art are contemplated as being usable in this aspect of the invention (e.g., a button, a levered grip, etc.). Outer rim 324 of receiving end 314 rests against the outer lip of container 180 when dispenser 310 is threaded onto the container. Valve actuating pin 340 is disposed in dispensing end 312 but is preferably fixed, i.e., not reciprocatable. When dispensing end 312 is secured to a valve or port, pin 340 opens the valve.

Container 180 is provided with a seal 185 which must be punctured to allow the contents of the container to exit. To this end, dispenser 310 is provided with a piercing valve 350. The shaft may be provided with threads 352 which matingly engage with corresponding threads in the main body of dispenser 310. As handle 356 is rotated, piercing pin 354 moves downwards and pierces seal 185; when the handle is rotated in the reverse direction, the pin is withdrawn and the contents of the container can escape through the pierced seal 185. If it is desired to stem the flow of the contents, the handle may be again rotated to lower pin 354 into the hole it made in seal 185. The concept shown in FIG. 8 may be used with either the angled embodiment of FIGS. 1–5 or the straight embodiment of FIGS. 6 and 7.

Figure 9:
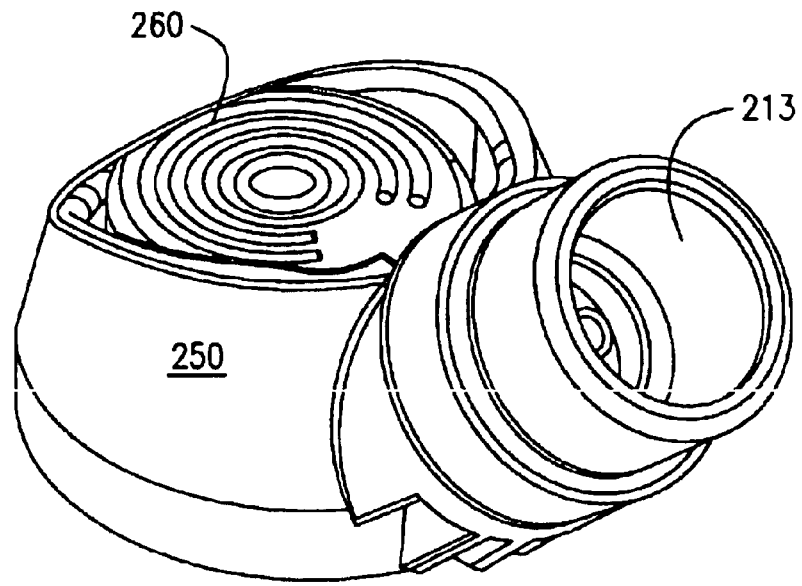
FIG. 9 is a perspective view of another embodiment of the invention.
Figure 10:
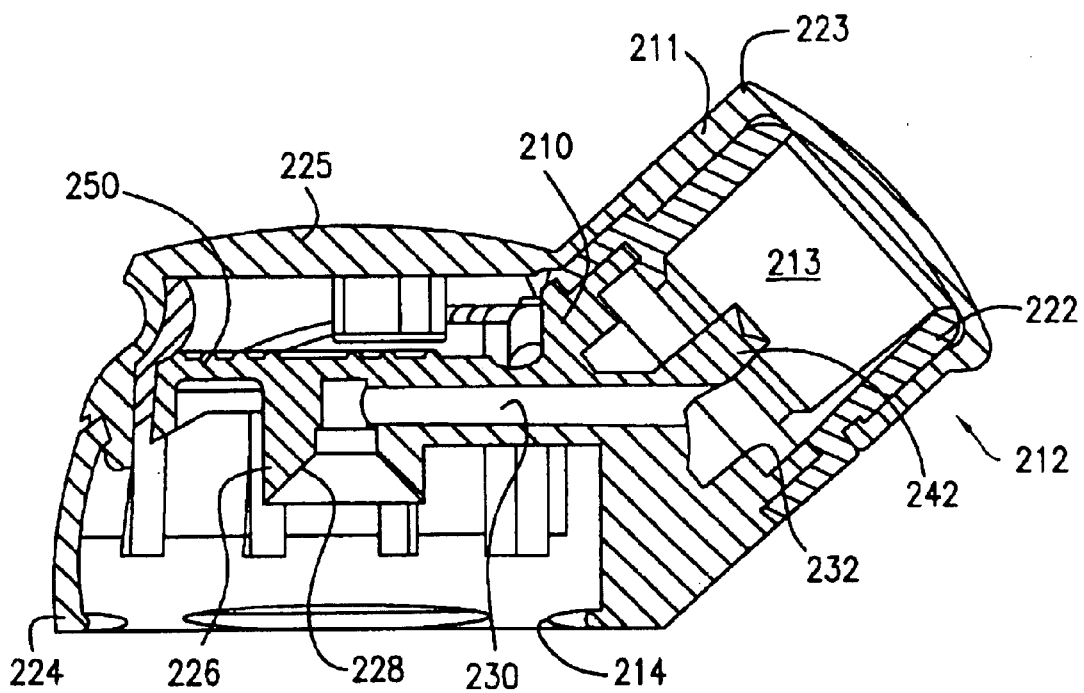
FIG. 10 is a sectional view of the embodiment of FIG. 9.

Another embodiment of the inventive adapter is depicted in FIGS. 9 and 10. Housing 210 is provided with a dispensing end 212 and a receiving end 214. Dispensing end 212 includes a well 213 formed by hub 222 which, in this embodiment, is adapted to receive an automobile air conditioner low pressure service port. A fixed core depressor 242 projects into well 213 so that when dispensing end 212 is fitted onto a service port, core depressor 242 opens the valve in the service port.

Receiving end 214 is similar to receiving end 14 described above. It includes a lip 224 which snaps onto and under a shoulder of a pressurized container such as shoulder 82 of container 80 of FIG. 5. Recessed within receiving end 214 is button 260. Button 260 includes a central hub 226 provided with a cavity 228 which receives a stem from a valve of a pressurized container. Cavity 228 is connected to channel 230 formed in button 260 which terminates in chamber 232. Chamber 232 is in communication with well 213. In the preferred embodiment, button 260 is fixed at one end in a cantilever manner and is allowed to flex under the pressure of a user pushing downward on the button. When the user does so, button 260 moves towards receiving end 214, and one of the inner walls of cavity 228 engages the stem of the container valve to open same. The pressurized chemicals in the container travel into cavity 228, along channel 230, into chamber 232. From there, the chemicals move through well 213 into the service port valve of the air conditioner (or other automotive system).

Figure 11:
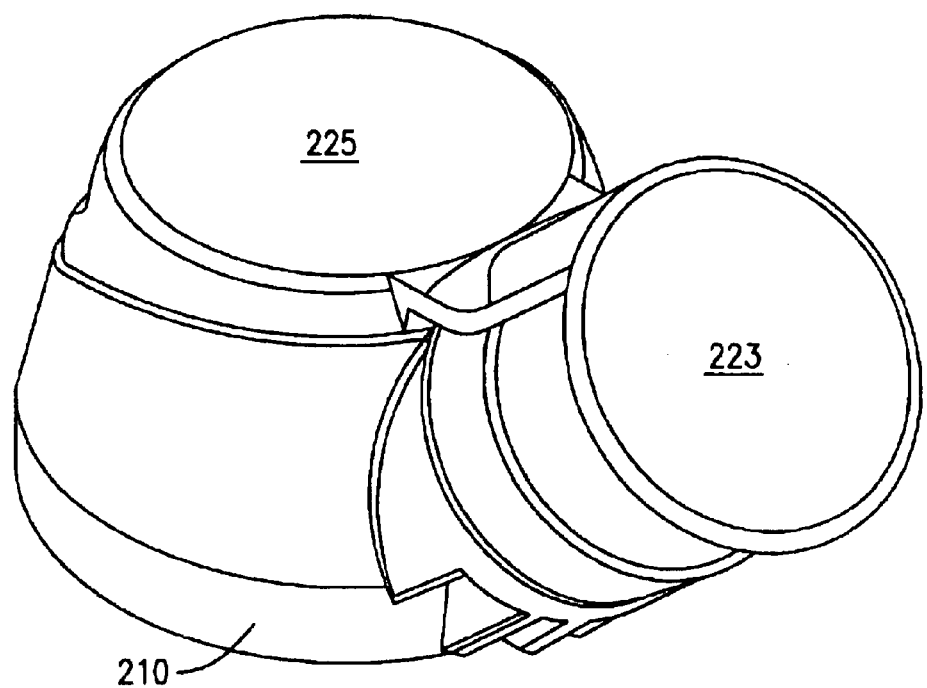
FIG. 11 is a perspective view of the embodiment of FIG. 9 with a cap.

Housing 210 includes side walls 250 to shield button 260 from inadvertent contact. As shown in FIG. 11, the dispenser also comes with a removable cap 211 having two sections; section 223 covers well 213, and section 225 covers button 260.

Having described several embodiments of the invention, it is to be understood that the description is not meant as a limitation excluding such further variations or modifications as may be apparent or may suggest themselves to those skilled in the art. It is intended that the present invention cover such variations and modifications as fall within the scope of the claims appearing hereinbelow.

What is claimed is:

1. A dispensing adapter for pressurized containers, comprising:
   a housing having a dispensing end and a receiving end, said dispensing end being in communication with said receiving end, said receiving end being adapted to sealingly engage a first valve of a pressurized container, and said dispensing end being adapted to sealingly engage a second valve; and
   a movable button disposed in said housing between said receiving end and said dispensing end, said button having a proximal cavity disposed closer to said receiving end adapted to receive a stem of the first valve and a distal end disposed closer to said dispensing end,
   wherein when said button is moved toward said receiving end of said housing, at least one inner wall of said proximal cavity engages the stem of the first valve and opens the first valve.

2. A dispensing adapter for pressurized containers according to claim 1, further comprising a projection formed in said dispensing end, wherein when said dispensing end of said housing is attached to the second valve, said projection engages and opens the second valve.

3. A dispensing adapter for pressurized containers according to claim 2, wherein the second valve is an automobile air conditioner service port, the service port having a port valve stem which engages said projection when said dispensing end is attached to the service port.

4. A dispensing adapter for pressurized containers according to claim 1, wherein said receiving end comprises a positive lock grasping the pressurized container.

5. A dispensing adapter for pressurized containers according to claim 4, wherein said positive lock comprises a lip which frictionally engages a shoulder of the pressurized container.

6. A dispensing adapter for pressurized containers according to claim 5, said button being attached to said housing in a cantilever manner, a top surface of said button being accessible outside said housing,
   wherein when said lip is locked onto the shoulder of the container and force is applied to said top surface of said button, said button flexes towards said receiving end and said at least one inner wall of said proximal cavity engages the stem of the first valve.

7. A dispensing adapter for pressurized containers according to claim 1, said button further comprising a fluid flow channel in communication with said proximal cavity and said dispensing end, wherein when the first valve is opened, at least part of the fluid in the pressurized container exits the container, travels along said fluid flow channel, and exits said housing via said dispensing end.

8. A dispensing adapter for pressurized containers according to claim 1, wherein said receiving end is substantially flat and said housing is angled with respect to said receiving end.

9. A dispensing adapter for pressurized containers according to claim 8, wherein said housing is angled at approximately 45° with respect to said receiving end.

10. A dispensing adapter for pressurized containers according to claim 1, wherein said dispensing adapter is made of plastic parts.

11. A dispensing adapter for pressurized containers according to claim 10, wherein said dispensing adapter compresses a unitary plastic assembly of said plastic parts.

12. A dispensing adapter for pressurized containers according to claim 1, said button being attached to said housing in a cantilever manner, a top surface of said button being accessible outside said housing,
   wherein when force is applied to said top surface of said button, said button flexes towards said receiving end and said at least one inner wall of said proximal cavity engages the stem of the first valve.

13. A dispensing adapter for pressurized containers, comprising:
   a housing having a dispensing end and a receiving end, said dispensing end being in communication with said receiving end, said receiving end being adapted to sealingly engage a first valve of a pressurized container, and said dispensing end being adapted to sealingly engage a second valve, said housing further including a first set of threads; and
   a movable piercing valve disposed in said housing between said receiving end and said dispensing end, said piercing valve having a distal end disposed closer to said receiving end adapted to selectively pierce the first valve, said piercing valve further including a proximal end having a handle, and a second set of threads matingly engageable with said first set of threads,
   wherein when said handle is rotated, said piercing valve moves longitudinally with respect to said housing and the container.

* * * * *